United States Patent [19]

Meyer

[11] 4,046,388
[45] Sept. 6, 1977

[54] SEAL ARRANGEMENT UTILIZING DEFLECTOR SEALS OF REDUCED RADIAL DIMENSION

[75] Inventor: Charles A. Meyer, Upper Providence, Pa.

[73] Assignee: Westinghouse Electric Corporation, Pittsburgh, Pa.

[21] Appl. No.: 665,347

[22] Filed: Mar. 9, 1976

[51] Int. Cl.² ............................................. F16J 15/50
[52] U.S. Cl. ................ 277/53; 415/170 R; 415/172 A
[58] Field of Search .......... 415/170 R, 172 A, 174, 415/131; 277/53, 54, 55, 56, 57

[56] References Cited

U.S. PATENT DOCUMENTS

| 1,458,489 | 6/1923 | Lee | 277/56 |
| 1,610,010 | 12/1926 | Johnson | 277/56 |
| 1,651,855 | 12/1927 | Warren | 277/55 |
| 1,708,044 | 4/1929 | Baumann | 277/57 |
| 1,819,864 | 8/1931 | Bloomberg | 415/172 A |
| 1,823,309 | 9/1931 | Allen | 415/131 |
| 1,831,242 | 11/1931 | Hanzlik | 415/170 R |
| 2,020,986 | 11/1935 | Anoschenko | 415/172 A |
| 3,720,419 | 3/1973 | Adelizzi | 415/174 |

FOREIGN PATENT DOCUMENTS

| 964,737 | 5/1957 | Germany | 277/53 |
| 1,159,277 | 4/1967 | Germany | 277/55 |
| 113,011 | 12/1925 | Switzerland | 277/55 |

Primary Examiner—C. J. Husar
Attorney, Agent, or Firm—F. J. Baehr, Jr.

[57] ABSTRACT

A seal arrangement for preventing leakage of a fluid from a high pressure region to a lower pressure region through a radial gap defined between a stationary member and a member rotating relative thereto. A stationary seal member is provided which substantially closes the radial gap but which defines a narrow radial clearance therebetween. Deflector seals are mounted on the rotating member and exhibit predetermined axial alignment with the stationary seal, the deflector seals extending radially outward from the rotating member for a distance less than the clearance defined between the stationary seal and the rotating shaft.

1 Claim, 12 Drawing Figures

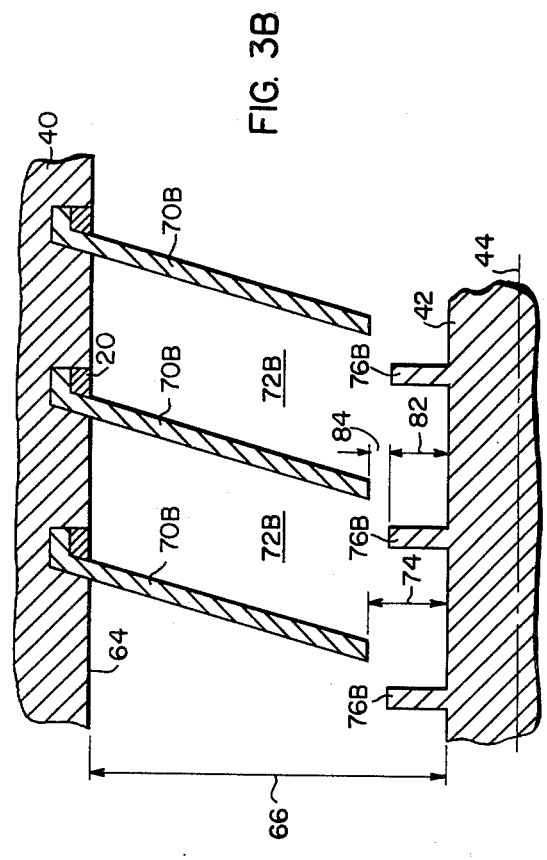
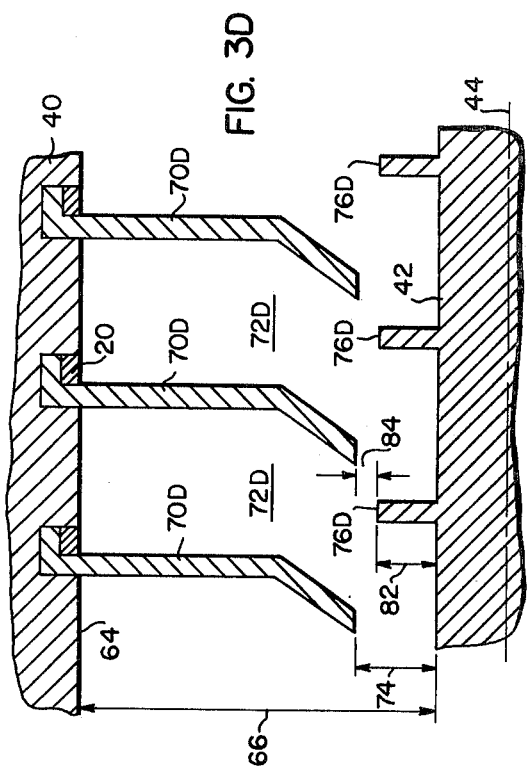
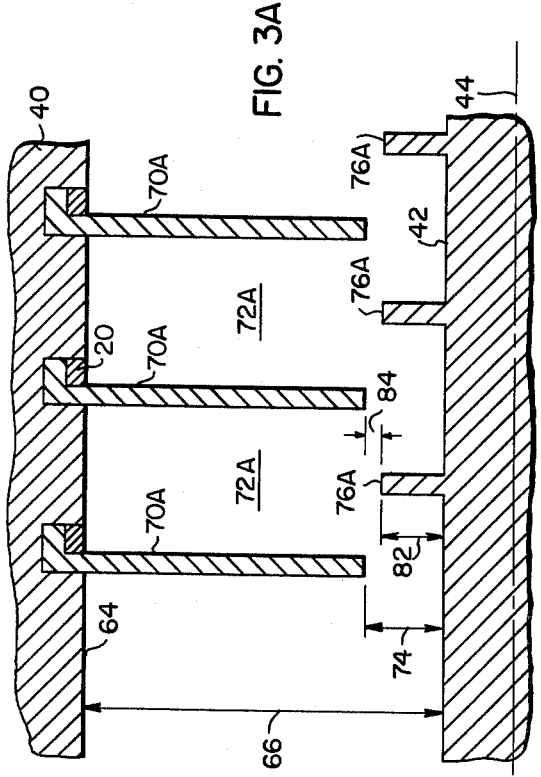
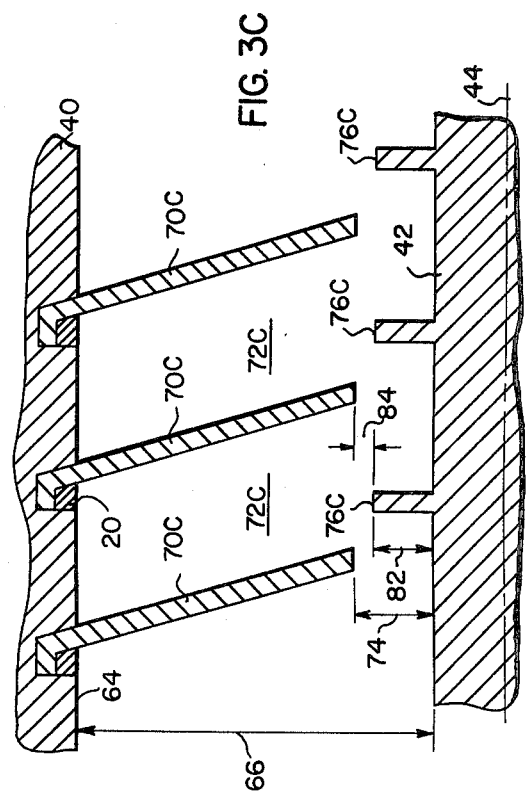

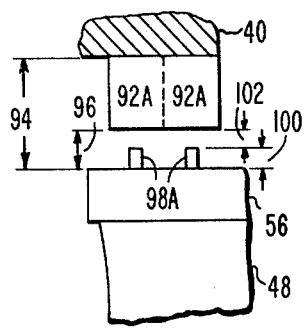
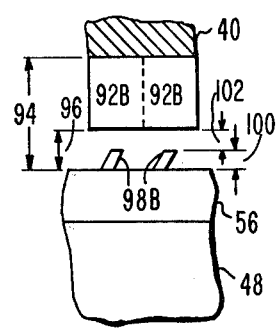
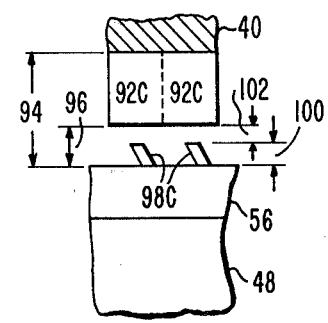
FIG. 4A          FIG. 4B          FIG. 4C
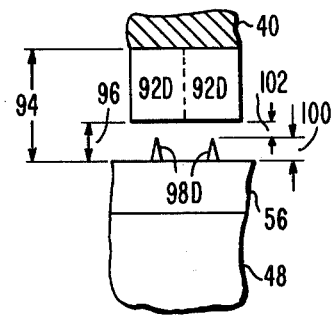
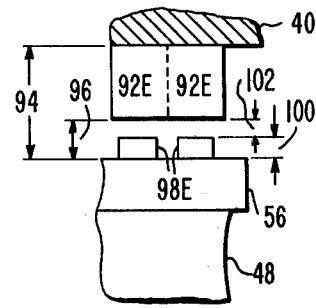
FIG. 4D          FIG. 4E
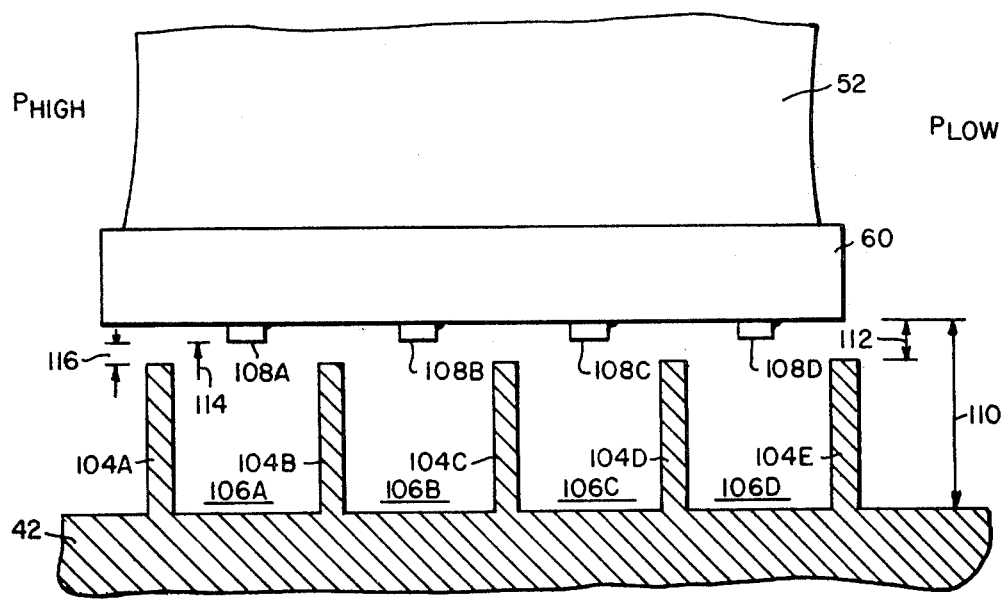
FIG. 5

SEAL ARRANGEMENT UTILIZING DEFLECTOR SEALS OF REDUCED RADIAL DIMENSION

BACKGROUND OF THE INVENTION

1. Field of the Invention:

This invention relates to seal arrangements between rotating and stationary members, and in particular, to a seal arrangement which reduces velocity carryover and at the same time is impervious to axial deflections of the rotating member.

2. Description of the Prior Art:

It is well known in the sealing art to utilize a labyrinth seal in order to provide effective sealing between a rotating and a stationary member and to isolate the interior of a casing from the exterior thereof along an interface between the casing and a rotating shaft passing therethrough. It is also well known that such labyrinth seals increase their effectiveness if there is provided some method of preventing or diverting the velocity of a fluid from carrying over from a given labyrinth seal strip to the next axially adjacent seal strip. If such velocity carryover is permitted, a greater leakage of fluid through the entire labyrinth seal arrangement occurs.

Thus, it is common practice to provide deflector strips on one of the adjacent members, usually the rotating member, which are staggered between adjacent axial seal strip rows and which are overlapped radially by the seal strip. For example, in the turbine art, it is well known to provide a labyrinth seal in which the seal strips extend radially inward from the interior of the casing (the stationary member), while the deflector strips are positioned on the rotating member such that the deflectors are axially interspersed between the adjacent axial seal strips. Also the deflector seals extend radially outward from the rotating member for a distance sufficient to have the deflector seals overlapped by the radial dimension of the labyrinth seal strip. Such seal arrangements may be provided in which the deflectors extend radially and terminate along a common datum parallel to the axis of rotation, or else provided such that the deflectors are stepped and proceed at an angle relative to the axis of the rotating shaft.

Such staggered seals have however not been utilized in regions of the apparatus where displacement of the deflector seals may occur, such as displacement resulting from thermal expansion. Thus, for example, it is not common practice in the art to utilize a labyrinth seal strip with associated deflectors in a staggered axial relationship at the extremities of turbine rotor shafts to prevent leakage from the interior of the turbine along the shaft at the point that the shaft passes through the casing. This is so since the rotor may experience "end travel" due to thermal expansion thereof and such end travel would generate abrasion between the deflectors and the radially overlapping labyrinth strips to negate the effectiveness of the seal provided.

SUMMARY OF THE INVENTION

This invention provides a seal arrangement in which the deflector seal strips are mounted on one of the adjacent members and extend radially relative thereto for a distance less than the clearance distance defined between the radial terminus of the seal mounted on the other member and the member on which the deflector is mounted. Such a disposition at the same time effects a suitable sealing action and also avoids any possibility of abrasion if axial displacement of the other member occurs.

It is an object of this invention to provide a seal arrangement which effectively prevents leakage of the fluid along a rotating shaft or blade shroud at the location where the shaft passes through a stationary casing member through the prevention of fluid velocity carryover, yet, at the same time, eliminates the possibility of seal damage through abrasion due to axial displacement of one of the mounting members. Other objects of the invention will be clear from the following detailed description of the preferred embodiment which follows herein.

BRIEF DESCRIPTION OF THE DRAWINGS

The invention will be fully understood from the following detailed description of the preferred embodiment thereof, taken in connection with the accompanying drawings, in which:

FIGS. 3A through D are an expanded elevational view, of a portion of FIG. 2, entirely in section, showing a sealing arrangement embodying the teachings of this invention utilized to prevent the escape of fluid from the interior of a casing member at a point where a rotating shaft passes therethrough;

FIGS. 4A through E are an expanded elevational view of a portion of FIG. 2 showing a seal arrangement embodying the teachings of this invention when utilized to prevent leakage between a rotating array of turbine blades and the casing disposed therearound; and FIG. 5 is an expanded elevational view, of a portion of FIG. 2, showing another area of utilization of a seal embodying the teachings of this invention.

DESCRIPTION OF THE PREFERRED EMBODIMENT

Figure 1:
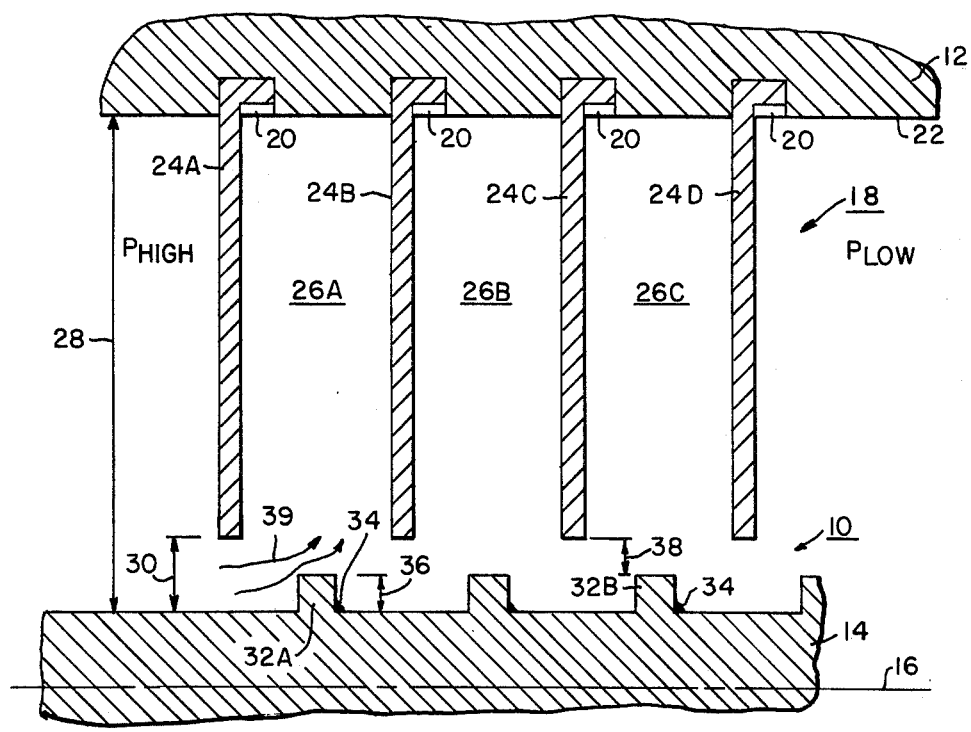
FIG. 1 is a schematic diagram illustrating the principles of operation of a seal arrangement embodying the teachings of this invention.

Throughout the following description, similar reference characters will refer to similar elements in all Figures of the drawing.

Referring first to FIG. 1, a diagrammatic view illustrating the principles of operation of a seal arrangement 10 embodying the teachings of this invention is shown. In general, the seal arrangement 10 is provided to prevent the leakage of a fluid from a higher pressure region ($P_{HIGH}$) to a lower pressure region ($P_{LOW}$) along the interface between a stationary member 12 and a member 14 rotating about an axis of rotation 16 as that member 14 passes through the stationary member 12. Although illustrated on only one side of the axis 16 for clarity in FIG. 1, it is to be understood that the seal arrangement 10 is symmetric thereto.

The seal arrangement 10 comprises a stationary seal element 18 securely fastened by suitable means 20 (such as caulking) to the interior of an opening 22 provided within the stationary member 12. In FIG. 1, the stationary seal 18 is shown as a plurality of axially spaced labyrinth seal strips 24A through 24D which respectively define therebetween fluid containment volumes 26A through 26C. Of course, as will be discussed herein, any well-known stationary seal may be utilized as the stationary element 18.

As seen in FIG. 1, a gap of predetermined radial dimension 28 (relative to the axis 16) is defined between the opening 22 and the surface of the rotating member 14. As also is discernible from the FIG. 1, the stationary seal 18 extends radially inward, relative to the axis of rotation 16, from the stationary member 12 a predetermined distance such as to define a narrow clearance 30 which is less than the gap distance 28. Completing the seal arrangement 10 embodying the teachings of this invention, there is provided a plurality of deflector seals 32A through 32C mounted by any suitable means 34 to the rotating member 14.

As seen in FIG. 1, the deflector seals 32 are located axially along the rotating member 14 so as to be radially adjacent to the volumes 26A through 26C defined by the stationary seal elements 18. However, the radial height of the deflector seals 32, measured relative to the axis of rotation 16, is a height 36 which is less than the magnitude of the clearance 30 between the stationary seal 18 and the surface of the rotating member 14. Thus, a narrow annular clearance band 38 is extant between the radially outward terminus of the deflector 32 and the radially inward terminus of the stationary seal 18.

It has been empirically verified that a deflector seal of a height 36 less than the dimension of the clearance 30 still accomplishes the deflection of fluid passing from the high to the low pressure region into the fluid containment volumes to prevent fluid velocity carryover through adjacent seal strips and containment volumes in a manner almost as efficient as that demonstrated by the radially overlapped deflector strips of the prior art. The deflection of a typical fluid leakage path, caused by the presence of the deflector 32, is illustrated on FIG. 1, as at 39. Thus, velocity carryover is prevented. In the prior art, of course, the deflector strips extended radially for a distance which is greater than the magnitude of the clearance between the stationary seal 18 and the surface of the rotating member 14.

Test results have shown that leakage has been reduced by a factor of one half if the height 36 of the deflector strips 32 approximates ¾ of the clearance distance 30. It is also to be pointed out, however, that the deflector strips are also effective to provide deflection of fluid (as at 39) into the containment volumes 26 to prevent the carryover of fluid velocity to adjacent containment volume if the height 36 of the deflector strips 32 is at least approximately 50% of the clearance 30.

As stated earlier, since the height 36 of the deflector strips 32 is less than the clearance 30, the narrow clearance band 38 is extant between the stationary seals 18 and the deflector strips 32 mounted on the rotating member 14. This clearance band 38 provides the advantage not obtainable in the prior art in that axial deflections of either the stationary or the rotating member relative to the other will not generate abrasion between the stationary seal 18 and the deflector seal 32. Thus, a seal arrangement 10 embodying the teachings of this invention is utilizable in those regions in which they have heretofore been unable to be disposed since the possibility of seal abrasion on the occurrence of axial displacement of the stationary or rotating members is totally avoided by the invention disclosed herein.

Having thus described the principles of operation of a generalized seal arrangement 10 embodying the teachings of this invention, attention is directed to FIGS. 2 through 5 wherein the seal 10 embodying these teachings is utilized in specific operating environments within a turbomachine, such as a turbine or compressor.

However, it is to be understood that the teachings of applicant's invention as discussed in connection with FIG. 1 are applicable to any environment in which sealing is required to prevent the flow of fluid from the high pressure region to a lower pressure region between a rotating and a stationary member.

Figure 2:
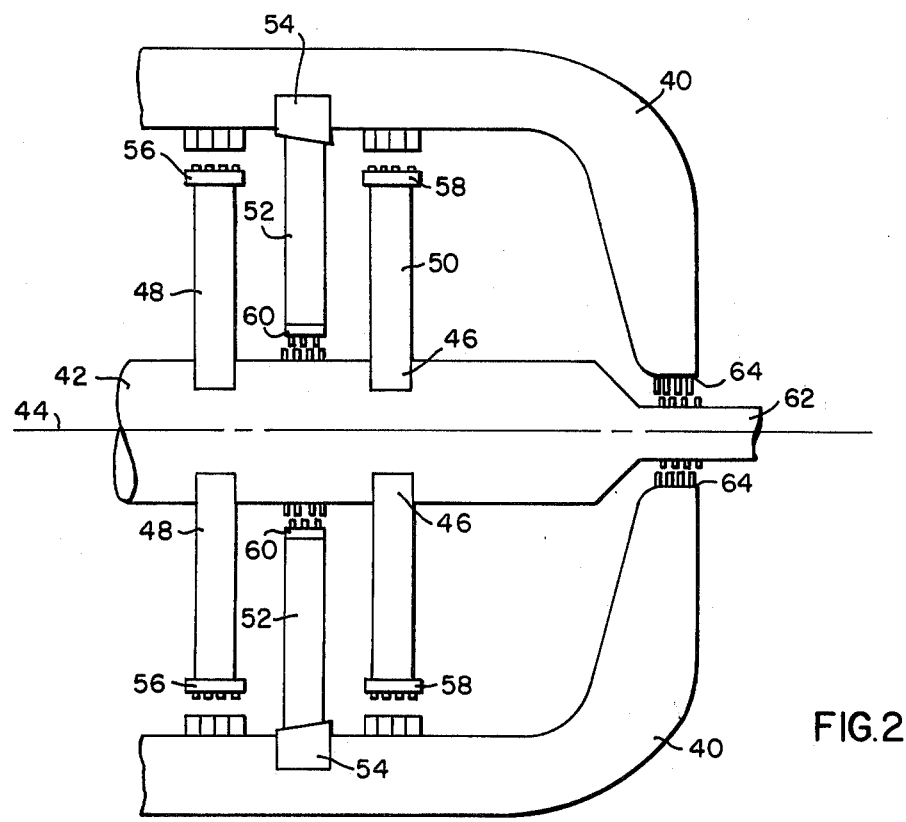
FIG. 2 is a schematic view of a turbine apparatus having seals embodying the teachings of this invention located at predetermined regions therein.

As seen in FIG. 2 and as understood by those skilled in the art, the overall steam turbine environment in which the teachings of this invention find particular advantage comprises a casing 40 totally surrounding and enclosing a rotor 42 having an axis of rotation 44 therethrough. Attached to the rotor 42 by suitable root portions 46 are a plurality of arrays of rotating blades, with two such arrays 48 and 50, being illustrated. Axially intermediate the rotating blade arrays 48 and 50 is an array of stationary nozzle blades 52, which depend from a blade ring 54 affixed to the casing 40. The rotating arrays 48 and 50 each have a shroud, 56 and 58 respectively, subtending the blade array. Similarly, there is provided a shroud 60 subtending the stationary array 52. The rotor 42 exits the casing 40 in the area of the journal portion 62, through an opening 64.

As will be pointed out in more detail in the following Figures and description, sealing is usually required between the shrouds of the rotating blades 56 and 58 and the interior of the casing 40, between the stationary blade shroud 60 and the surface of the rotor 42, and between the rotor 42 and the casing 40 in the area of the journal 62.

In the more detailed Figures which follow, various embodiments of the seal embodying the teachings of this invention will be described, all of which utilize the principle of operation described in connection with FIG. 1. Further, although a specific embodiment may be described in connection with a specified area of the turbine, it is understood that any embodiment may be utilized in any region of the turbine, and in any other rotating apparatus, to provide effective sealing therefor.

With reference to FIGS. 3A through D, an expanded view of a portion of FIG. 2 is shown, wherein a stationary member, such as the turbine casing 40 having the opening 64 therein through which passes the turbine shaft member 42 rotating along the axis of rotation 44. A radial gap 66 is defined between the opening 42 and the surface of the rotor 44. In this embodiment, the stationary seal element 68 is satisfied by the provision of variously oriented labyrinth seal strips 70A through D which extends radially into the gap 66 and have circumferential distal ends and which define a plurality of fluid containment volumes 72A through D. A clearance 74 is defined between the stationary seal 68 and the rotating shaft 42. Mounted on the rotating shaft 42 are a plurality of deflector seals 76A through D. As is true for the generalized case of FIG. 1, it is to be noted that the axial length 78 of the deflector seal element along the rotating shaft 44 is substantially equal to the axial length 80 of the stationary seal 68.

In this embodiment, the height 82 of the deflector seals 76A through D is approximately 75% of the height of the clearance 74. Such a disposition provides for suitable seal arrangement to prevent passage of higher pressure fluid from the interior to the exterior of the casing 40 along the shaft 42 in a manner described in connection with FIG. 1. Also, any possibility of seal rub between the deflectors 76 and the stationary seal 68 is precluded due to the existence of the clearance band 84 between the deflectors 76 and the stationary seal 68. The typical dimensions for such an arrangement would define a clearance 74 of approximately 0.060 inches and the height 82 of the deflector seal being then approximately 0.045 inches. As seen, the deflectors 76 may be utilized with any configuration of stationary labyrinth strip 70.

Referring now to FIGS. 4A through E, an expanded view of a portion of FIG. 2 illustrates another typical application of the seal embodying the teachings of this invention is that disclosed wherein a seal arrangement is provided to prevent leakage of higher pressure fluid along the radial extremity of rotating blades 48 or 50 terminating in the shroud members 56 or 58 and the interior of the turbine casing 40. In these Figures, several alternate embodiments of deflector seals are shown to be within the contemplation of this invention. Of course, any one of the deflectors illustrated may be utilized, the variations being shown only to indicate the scope of flexibility provided by the inventive teachings defined herein. In the situation shown in FIG. 4, the stationary seal 90 is a honeycomb seal which defines a plurality of fluid containment volumes 92A through E therein. As is known to those skilled in the art, the larger diameters and clearances about the circumference of the rotating blade tips usually leads practitioners to utilize honeycomb seals in this region. Alternatively, labyrinth strips (FIGS. 3A through D) are usually utilized as stationary seals in the area of the journal 62.

A radial gap of magnitude 94 is extant between the tip of the shroud 56 and the interior of the casing 40. Mounted from the interior of the casing 40 is the stationary honeycomb seal 90 having the plurality of fluid containment volumes 92A through 92E therein. A clearance 96 is defined between the radially inward terminus or distal margin of the stationary seal 90 and the radially outward surface of the shroud 56. Mounted on the shroud 56 is a plurality of deflector seals 98A through 98F located so as to be axially adjacent to the fluid containment volumes. The height 100 of the deflectors 98 in this embodiment is approximately 50% of the clearance distance 96. Thus, for a clearance 96 of 0.060 inches, the deflectors will be approximately 0.030 inches.

As seen in FIGS. 4A through E, alternate embodiments of the invention which are directed to variations to the deflector seals 98A through E, mounted on the rotating shroud 56, include radially extending deflectors 98A. As with deflector 98A, the deflector seals 98B or C may be inclined relative to the axis of rotation 44 (FIG. 2). The angulation of the deflectors can be either toward (98B) or away from (98C) the high-pressure region. However, in either case, the radial height 100 of each deflector is approximately 50% of the gap 96. Also shown in FIGS. 4A through E is the principle that the deflector need not be a separate element added to the turbine shaft, but may, for example, be provided by machining a portion of the shroud 56 so as to provide a radial protuberance thereon (98D) or provide a step (98E) of a predetermined ratio of the clearance 96 between the stationary seal 90, and the surface of the rotating shroud 56.

The radially outward tips of the deflectors 98A through E define a predetermined band 102 between themselves and the radially inward tips of the stationary seal 90. All of the advantages of the generalized embodiment shown in FIG. 1 are present in the embodiment shown in FIGS. 4A through E. Thus the deflectors seals 98A through E prevent fluid velocity carry-over between axially adjacent stationary seal strips 76 as described in FIG. 1, while at the same time, any possibility of damage to the seal due to axial thermal expansion is precluded by the existence of the band 102.

The fabrication of the deflectors 98D for example, may be accomplished by grinding the shroud 56 with a grinding wheel which has suitable hollows or depressions therein corresponding to the predetermined shape of the deflector as either 98D or 98E or any suitable shape. Thus, as the shroud 56 is ground, the wheel does not remove a volume of material from the shroud adjacent the hollows. Therefore, when grinding is finished, the shroud 56 has disposed thereon, and integral therewith, deflectors as shown at 98D and 98E.

Referring to FIG. 5, an expanded view of yet another portion of FIG. 2 is shown, this dealing with the sealing effected in the region of the stationary shroud 60 at the termini of the nozzles 52 and the surface of the rotor 42. In this embodiment, it is noted that the labyrinth seal strips 104A through E, defining fluid containment volumes 106A through D, are mounted on the rotating member 42. Also, deflectors 108A through D are mounted upon the stationary shroud 60.

A gap 110 is defined between the shroud 60 and the surface of the rotor 42, with a clearance 112 between the end of the labyrinth strips 104 and the shroud 60 also extant. This gap 112 is typically 0.060 inches and the height 114 of the deflectors 108 being approximately 50% of the gap 112 (i.e. approximately 0.030 inches). Thus, as in the other embodiments, a predetermined band 116 is extant so that axial movement of one member relative to the other does not cause abrasion and initiate the effectiveness of the seal arrangement described herein.

Having described the principles of operation and several particular embodiments of the invention, it is apparent to those skilled in the art that using applicant's teaching as described herein, any combination of stationary seal and deflector seal may be made without departing from the spirit of applicant's invention as defined in the appended claims.

Since numerous changes may be made in the above described embodiments without departing from the spirit hereof, it is intended that all subject matter contained in the foregoing description or shown in the accompanying drawings shall be interpreted in an illustrative and not in a limiting sense.

I claim as my invention:

1. A seal arrangement between a stationary member and a rotatable member disposed therein so as to have a predetermined gap therebetween defining an annular space for reducing the flow of fluid across said annular space from a high pressure to a low pressure region, said seal arrangement comprising:
   a plurality of spaced apart circumferential seal strips extending generally radially into said annular space from one of said members and having distal margins spaced from the other of said members;
   a plurality of spaced apart circumferential deflector strips extending generally radially into said annular space a distance that is generally 50% to 75% of the distance from the distal margin of the seal strip to the other member and the deflector strips having distal margins spaced from said one member;
   said seal and deflector strips being spaced apart axially generally on the same pitch and disposed generally one-half pitch out of phase with respect to the other so that if extended radially, they would interdigitate and each strip extends into said space a distance such that the sum of the radially extending distance of adjacent opposing strips is less than the gap between the stationary and rotatable members.

* * * * *